United States Patent
Patel-Framroze

(10) Patent No.: US 6,694,330 B2
(45) Date of Patent: Feb. 17, 2004

(54) SYSTEM AND METHOD FOR IDENTIFYING THE RAW MATERIALS CONSUMED IN THE MANUFACTURE OF A CHEMICAL PRODUCT

(75) Inventor: Bomi Patel-Framroze, Mumbai (IN)

(73) Assignee: Row 2 Technologies, Inc., Parsippany, NJ (US)

( * ) Notice: Subject to any disclaimer, the term of this patent is extended or adjusted under 35 U.S.C. 154(b) by 447 days.

(21) Appl. No.: 09/851,698

(22) Filed: May 9, 2001

(65) Prior Publication Data

US 2002/0188588 A1 Dec. 12, 2002

(51) Int. Cl.[7] ............................................. G06F 17/30
(52) U.S. Cl. ........................... 707/104.1; 707/1; 707/2; 707/3; 707/4; 707/5; 707/6
(58) Field of Search ............................... 707/3–6, 104.1

(56) References Cited

U.S. PATENT DOCUMENTS

| | | | |
|---|---|---|---|
| 4,811,217 A | * | 3/1989 | Tokizane et al. ................ 707/3 |
| 5,577,239 A | | 11/1996 | Moore et al. |
| 5,950,192 A | | 9/1999 | Moore et al. |
| 6,122,622 A | * | 9/2000 | Wiitala et al. .................. 705/28 |
| 6,185,506 B1 | | 2/2001 | Cramer et al. |
| 6,240,374 B1 | | 5/2001 | Cramer et al. |
| 6,304,869 B1 | * | 10/2001 | Moore et al. ................... 707/3 |
| 6,584,412 B1 | * | 6/2003 | Brecher ........................ 702/27 |

FOREIGN PATENT DOCUMENTS

WO    WO0079453 A2    12/2000

OTHER PUBLICATIONS

Ichikawa et al, U.S. patent application No. 2001/0018625 A1, Aug. 30, 2001.*

* cited by examiner

Primary Examiner—Greta Robinson
Assistant Examiner—Debbie M. Le
(74) Attorney, Agent, or Firm—Goodwin Procter LLP

(57) ABSTRACT

A system and method are disclosed that allow a user to identify, within a certain level of confidence, the raw materials consumed in the manufacture of a particular chemical product. In addition, the system and method allow a user to identify, within a certain level of confidence, the chemical products, the manufacturing processes of which, consume a raw material. The system compares a raw material or chemical product to a database of companies comprising the raw material purchases of companies, as well as the chemical products manufactured by companies. Through a statistical analysis, the system reports results to the user that meet a pre-established threshold of accuracy.

52 Claims, 2 Drawing Sheets

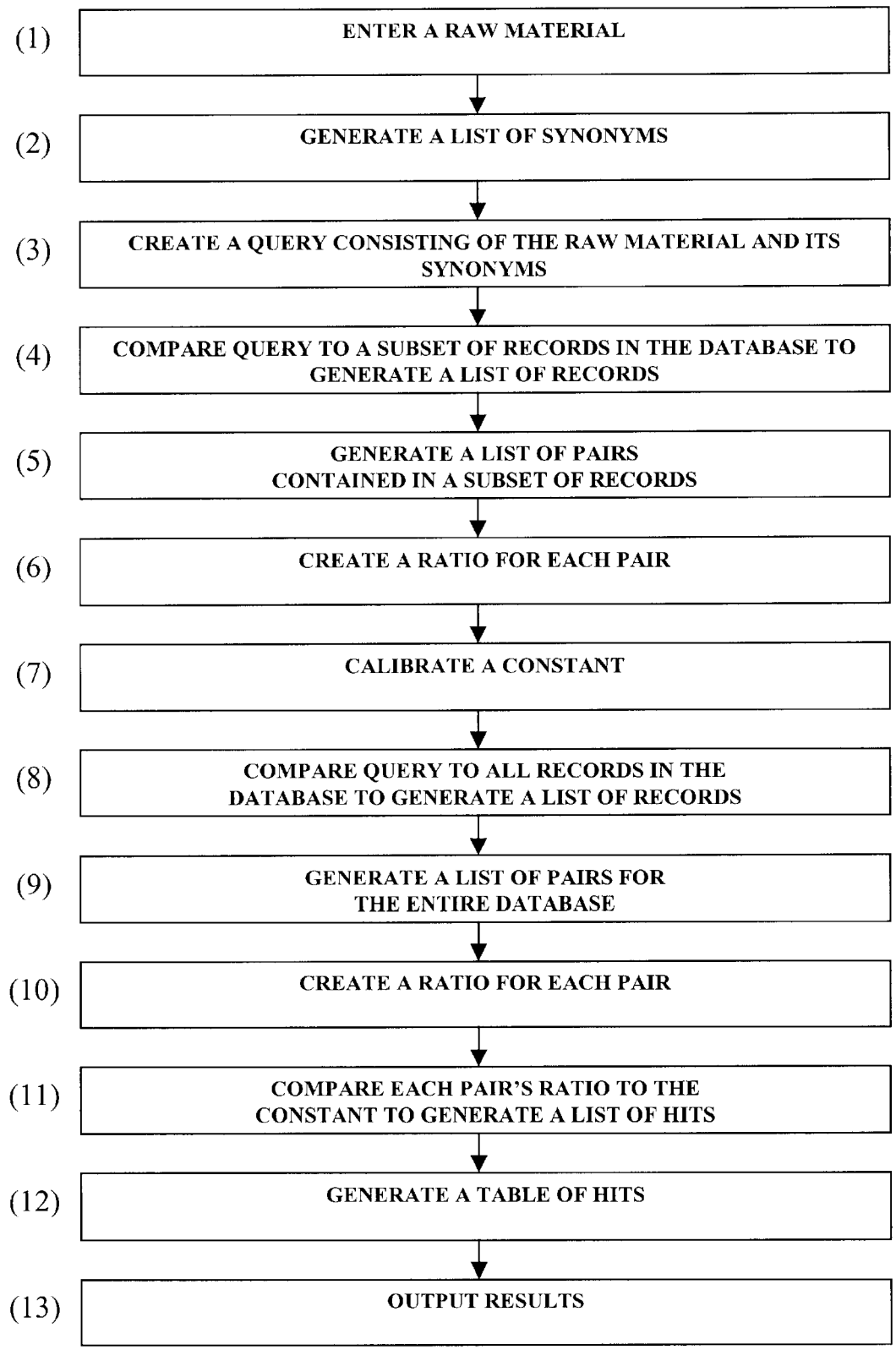

SYSTEM AND METHOD FOR IDENTIFYING THE RAW MATERIALS CONSUMED IN THE MANUFACTURE OF A CHEMICAL PRODUCT

RELATED UNITED STATES APPLICATIONS/ CLAIM OF PRIORITY

Not applicable.

FIELD OF THE INVENTION

The present invention relates to a system and method for identifying the raw materials consumed in the manufacture of a chemical product.

BACKGROUND OF THE INVENTION

The Internet is a global phenomena that has become an increasingly important platform for the buying and selling of chemicals. In order for entities offering business-to-business trading web sites over the Internet to distinguish themselves from their competitors, they must provide value added services that maximize the potential of the Internet platform. One of the most beneficial tools for sellers operating in the non-personalized environment of the Internet is a method to accurately target their sales efforts to real potential customers instead of the broadcast method currently available on the Internet.

It is very important to a raw material producer or trader to know which products consume a particular chemical as a raw material. Conversely, knowing what raw materials are used to create a chemical product could help a researcher or engineer determine how to manufacture a particular chemical product. The Internet contains global information on companies and the products that they buy and sell. A tool that uses this information to identify the raw materials consumed in the manufacture of a particular chemical products would be valuable to a raw material producer, as well as a chemical product manufacturer.

SUMMARY OF THE INVENTION

The present invention overcomes the aforementioned problems of the prior art by providing a more efficient solution. According to a first aspect of the present invention, a method for identifying chemical products, the manufacturing processes of which consume a certain raw material, is provided. The user enters a name of a raw material. A query is created consisting of the raw material and synonyms of the raw material. The query is compared to a database of companies comprising fields of chemical products manufactured by a company and raw materials purchased by a company. The present invention performs a statistical analysis on a database, and based on the analysis, identifies, within a certain level of confidence, chemical products, the manufacturing processes of which, consume the raw material.

In a second aspect of the present invention, a method for identifying raw materials consumed in the manufacture of a certain chemical product is provided. The user enters a name of a chemical product. A query is created consisting of the chemical product and synonyms of the chemical product. The query is compared to a database of companies comprising fields of chemical products manufactured by a company and raw materials purchased by a company. The present invention performs a statistical analysis on a database, and based on the analysis, identifies, within a certain level of confidence, raw materials that are consumed in the manufacture of a particular chemical product.

In a third aspect of the present invention, a computer-readable medium containing instructions for causing a processor to perform the method for identifying chemical products, the manufacturing processes of which consume a certain raw material, described above is provided.

In a fourth aspect of the present invention, a computer-readable medium containing instructions for causing a processor to perform the method for identifying raw materials that are consumed in the manufacture of a certain chemical product described above is provided.

In a fifth aspect of the present invention, a system for identifying chemical products, the manufacturing processes of which consume a certain raw material, is provided. The system comprises means for performing the method described above.

In a sixth aspect of the present invention, a system for identifying raw materials that are consumed in the manufacture of a certain chemical product is provided. The system comprises means for performing the method described above.

In a seventh aspect of the present invention, a server for identifying chemical products, the manufacturing processes of which consume a certain raw material, is provided. The server comprises memory containing a database of companies and an associated program, and a processor responsive to said program. The processor is configured to perform the method described above.

In an eighth aspect of the present invention, a server for identifying raw materials that are consumed in the manufacture of a certain chemical product is provided. The server comprises memory containing a database of companies and an associated program, and a processor responsive to said program. The processor is configured to perform the method described above.

In a ninth aspect of the present invention, a client machine for identifying chemical products, the manufacturing processes of which consume a certain raw material, is provided. The client machine comprises memory containing a program and a processor responsive to said program. The processor is configured to send a name of a raw material to a server so that the server will perform a statistical analysis according to the method described above. The client machine further comprises a monitor to display the results of said analysis.

And in a tenth aspect of the present invention, a client machine for identifying raw materials that are consumed in the manufacture of a certain chemical product is provided. The client machine comprises memory containing a program and a processor responsive to said program. The processor is configured to send a name of a chemical product to a server so that the server will perform a statistical analysis according to the method described above. The client machine further comprises a monitor to display the results of said analysis.

These and other aspects, features, and advantages of the present invention will become better understood with regard to the following description, claims, and accompanying drawings.

BRIEF DESCRIPTION OF THE DRAWINGS

Referring briefly to the drawings, embodiments of the present invention will be described with reference to the accompanying drawings in which:

FIG. 2 depicts a flow chart that illustrates the steps related to the method or process of one aspect of the present invention.

DETAILED DESCRIPTION OF THE INVENTION

Figure 1:
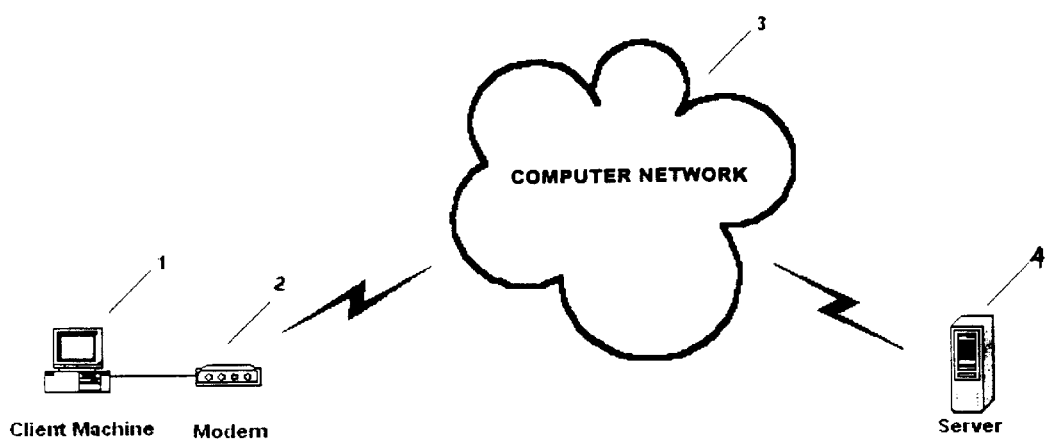
FIG. 1 depicts the hardware configuration of the present invention.

Referring more specifically to the drawings, for illustrative purposes the present invention is embodied in the system configuration, method of operation, and article of manufacture or product, such as a computer-readable medium, for example, a floppy disk, a conventional hard disk, CD-ROM, Flash ROM, nonvolatile ROM, RAM, and any other equivalent computer memory device, generally shown in FIGS. 1–2. It will be appreciated that the system, method of operation, and article of manufacture may vary as to the details of its configuration and operation without departing from the basic concepts disclosed herein. The following detailed description is, therefore, not to be taken in a limiting sense.

The present invention makes use of standard relational database technology such as that found in the commercial product Oracle Relational Database Management System ("Oracle") that is marketed by Oracle Corporation, World Headquarters, 500 Oracle Pkwy., Redwood Shores, Calif. 94065. All references to the retrieval and storage of information will be done in a standard relational database, and will use standard procedures for doing so, including structured query language ("SQL") commands. When the term "query" is used as a noun, "query" means comparison criteria that are used to extract all the records matching the comparison criteria. When the term "query" is used as a verb, "query" means to extract records from a database that match specified comparison criteria. The operations and functions of relational databases discussed in this patent application are well known to those of ordinary skill in the database management field. Those operations and functions can be found in numerous texts, including Oracle users' and developers' manuals.

I. Hardware

Referring now to FIG. 1, one embodiment of the relational database management system for identifying the raw materials consumed in the manufacture of a chemical product is shown (the "system"). The user of the system will access the system through a client machine (e.g., a personal computer) (1) that is connected to a computer network (3), such as the Internet, via a modem (2) or other communications device. Presently, one embodiment of the client machine is a personal computer with a processor speed of at least 800 MHz, system memory of at least 64 MB, a monitor and keyboard, and running Internet Explorer, version 4.0 or later, or Netscape, version 4.0 or later. And of course, the present invention can be practiced on a computer that is slower, or has less memory, or a computer that is faster, or has greater capability, than the embodiment of the personal computer described above. A user can send inputs to the system from a personal computer via a computer network (3). The system comprises a server (4), with its own computer processor and associated memory, and running relational database software. One embodiment of the computer network is a global TCP/IP based network such as the Internet or an intranet, although almost any well known LAN, MAN, WAN, or VPN technology can be used.

II. Relational Database Interface

In one embodiment, the user will interface with the system via a web site over the Internet, although, of course, other interface methods are available as noted above.

III. Database Structure

In one embodiment, the database structure comprises two tables: (i) a table of companies and (ii) a table of synonyms of chemical products and raw materials. The table of companies comprises the following fields:
(1) Name of Company;
(2) Chemical Products; and
(3) Raw Materials.

Such databases can be obtained from commercial vendors such as the Chemical Buyers' Guide, published by Sevak Publications Pvt. Ltd. The database can also be a functionally uniform database such as a database of the dye industry or pharmaceuticals in development. The Name of Company field contains the name of a company. The Chemical Products field includes all chemical products manufactured by a company within a certain timeframe. And the Raw Materials field includes all the raw materials purchased by a company within a certain timeframe. When multiple entries are made in a record for a certain field, the entries are separated by a delimiter.

The table of synonyms of chemical products and raw materials comprises a field for the name of a chemical product or raw material and a field for synonyms of the chemical product/raw material.

IV. Identifying the Chemical Products, the Manufacturing Processes of Which, Consume a Particular Raw Material Referring to FIG. 2, the process or flow chart for identifying the chemical products, the manufacturing processes of which, consume a particular raw material is illustrated. As shown in FIG. 2, the initial step is to enter a name of a raw material. In one embodiment, inputs will be entered remotely by a user on a personal computer connected to the Internet. The user then sends the input to the system, which includes the relational database described above. As shown in block 2, the system generates a list of synonyms of the raw material from a table of synonyms. This list may be stored in memory on a temporary basis. As shown in block 3, the system then creates a query consisting of the raw material and its synonyms.

As shown in block 4, the system compares the query to a subset of the records in the database to generate a list of records containing the raw material or at least one of the synonyms of the raw material, or both. This subset of records is selected randomly from the database containing anywhere from 1% to 10% of the companies in the database. The query is compared to the subset of records in the database using standard relational database technology. The system generates a list of records that contains the raw material or at least one synonym of the raw material, or both. This list may be stored in memory on a temporary basis. For example, if the raw material "2-octyl-1-dodecanol" is used as a query, the system would identify each record in which "2-octyl-1-dodecanol," or one of its synonyms, occurs in the Raw Materials field.

As shown in block 5, once the system generates a list of records, the system generates a list of pairs. This list of pairs may be stored in memory on a temporary basis. A pair is defined as the raw material of the query and one of the chemical products contained in one record from the list of matching records. Using the example from the previous paragraph, if the raw material "2-octyl-1-dodecanol" is entered as a query, and Company A has purchased "2-octyl-1-dodecanol," then the system will generate pairs for each of the chemical products manufactured by Company A. So if Company A produces hydrocortisone, estriol, and bifonazole, the system will generate three pairs matching "2-octyl-1-dodecanol" with the aforementioned chemical products respectively.

As shown in block 6, after the system identifies all pairs, it creates a ratio for each pair. The numerator of the ratio is the number of times that a pair occurs in the subset of records. The denominator of the ratio is the number of records that the raw material of the query, or at least one of its synonyms, appears in the subset of records. For example, in a subset of 100 records, if a given pair occurs 10 times, the numerator of the ratio is 10. If the raw material of the query, or at least one of its synonyms, appears in the subset of 100 records 15 times, the denominator of the ratio is 15. Thus, the overall ratio would be 10 divided by 15 or 0.667.

As shown in block 7, the system calibrates a constant based on historical comparisons of pairs within a database. The constant is set at a level that is determined to be accurate by chemical analysis for pairs within a particular database. For example, if the constant is set at 0.7, the ratio for a pair (a particular raw material and a particular chemical product) would have to be 0.7 or higher in order for the pair to be considered "legitimate" by the system. Once a constant has been calibrated, the constant may be fixed for that database so that subsequent queries to the system would skip steps 4 through 7.

As shown in block 8, after the system sets a constant for the database, the query is compared against all records in the database to generate a list of records containing the raw material or at least one of the synonyms of the raw material, or both. As shown in block 9, after the system generates a list of records, the system generates a list of pairs in a manner similar to that described above. As shown in block 10, the system creates a ratio for each pair in a manner similar to that described above. As shown in block 11, the system then compares each pair's ratio to the constant. When a pair's ratio meets or exceeds the constant, the system adds the pair to a list of hits. This list of hits may be stored in memory. Hits are pairs that are considered accurate enough to be reported to a user.

As shown in block 12, the system uses the list of hits to create a table comprising the chemical products, the manufacturing processes of which consume a particular raw material. As shown in block 13, the results of the system are reported to the user. Results are chemical products that are included in the table of hits. In one embodiment of the invention, results are displayed on the user's computer monitor.

In table 1 below are the results of the system when the raw materials "1,2,4-trichlorobenzene," "10-camphorsulfonic acid sodium salt," and "2-octyl-1-dodecanol," respectively, are used as an input on a database that is derived from the Chemical Buyer's Guide database published by Sevak Publications Pvt. Ltd.

TABLE 1

Results of Queries Using Selected Raw Materials

| Raw Material | Chemical Products |
| --- | --- |
| 1,2,4-trichlorobenzene | Tetradifon; Tetrachlorvinphos; Dicamba |
| 10-camphorsulfonic acid sodium salt | Guaiacol; Dipyrone |
| 2-octyl-1-dodecanol | Hydrocortisone; Bifonazole; Simenthicone; Estriol |

While this description has focused on the entry of a raw material as a query, a chemical product can be entered as the initial input to the system. The system would then follow the steps listed above, except that the chemical product would be paired with raw materials contained in records in the database, and the user will be presented with a list of raw materials consumed in the manufacture of the chemical product. For example, in table 2 below are the results of the system when the chemical products "acrylic emulsions," "alachlor," and "ioxynil," respectively, are used as an input on a database that is derived from the Chemical Buyer's Guide database published by Sevak Publications Pvt. Ltd.

TABLE 2

Results of Queries Using Selected Chemical Products

| Chemical Products | Raw Materials |
| --- | --- |
| Acrylic emulsions | n-butyl acrylate; vinyl acetate; styrene; formaldehyde; polyvinyl alcohol |
| Alachlor | Formaldehyde; chloro acetate chloride; 2,6 diethyl aniline; 4-hydroxy benzaldehyde; hydroxyl amine |
| Ioxynil | Hydrocortisone; bifonazole; simenthicone; estriol |

Having now described an embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

Moreover, the techniques may be implemented in hardware or software, or a combination of the two. Preferably, the techniques are implemented in control programs executing on programmable devices that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method for identifying chemical products, the manufacturing processes of which consume a certain raw material, in a database of companies comprising fields of chemical products manufactured by a company and raw materials purchased by a company, comprising the steps of:

receiving a name of a raw material;

generating a list of synonyms of said raw material from a table of synonyms;

creating a query consisting of said raw material and said synonyms of said raw material;

comparing said query to said database to generate a list of records that contain said raw material or at least one said synonym of said raw material, or both;

generating a list of pairs, wherein a pair is defined as said raw material and one said chemical product contained in one said record of said list of records;

creating a ratio for each said pair, wherein said ratio's numerator is the number of times said pair occurs in said database and said ratio's denominator is the number of records in the database that contain said raw material or at least one said synonym of said raw material, or both;

comparing said ratios to a constant, wherein said constant indicates the threshold for the magnitude of the ratio required for reporting that said raw material is consumed in the manufacture of a chemical product; and generating a list of hits, wherein a hit occurs whenever a ratio for a pair exceeds said constant.

2. The method for identifying chemical products of claim 1, further comprising the step of storing said hits in a table of hits.

3. The method for identifying chemical products of claim 2, further comprising the step of outputting results, wherein said results are chemical products that are included in said table of hits.

4. A method for identifying chemical products, the manufacturing processes of which consume a certain raw material, in a database of companies comprising fields of chemical products manufactured by a company and raw materials purchased by a company, comprising the steps of:

receiving a name of a raw material;

generating a list of synonyms of said raw material from a table of synonyms;

creating a query consisting of said raw material and said synonyms of said raw material;

comparing said query to a subset of said database to generate a list of records that contain said raw material or at least one said synonym of said raw material, or both;

generating a list of pairs, wherein a pair is defined as said raw material and one said chemical product contained in one said record of said list of records;

creating a ratio for each said pair, wherein said ratio's numerator is the number of times said pair occurs in said subset of said database and said ratio's denominator is the number of records in said subset of said database that contain said raw material or at least one said synonym of said raw material, or both;

calibrating a constant based on said ratios, wherein said constant indicates the threshold for the magnitude of the ratio required for predicting that said raw material is consumed in the manufacture of a chemical product; and comparing said query against the entire database to generate a list of pairs, create a ratio for each pair, and generate a list of hits, wherein a hit occurs whenever a ratio for a pair exceeds said constant.

5. The method for identifying chemical products of claim 4, further comprising the step of storing said hits in a table of hits.

6. The method for identifying chemical products of claim 5, further comprising the step of outputting results, wherein said results are chemical products that are included in said table of hits.

7. A method for identifying raw materials, that are consumed in the manufacture of a certain chemical product, in a database of companies comprising fields of chemical products manufactured by a company and raw materials purchased by a company, comprising the steps of:

receiving a name of a chemical product;

generating a list of synonyms of said chemical product from a table of synonyms;

creating a query consisting of said chemical product and said synonyms of said chemical product;

comparing said query to said database to generate a list of records that contain said chemical product or at least one said synonym of said chemical product, or both;

generating a list of pairs, wherein a pair is defined as said chemical product and one said raw material contained in one said record of said list of records;

creating a ratio for each said pair, wherein said ratio's numerator is the number of times said pair occurs in said database and said ratio's denominator is the number of records in the database that contain said chemical product or at least one said synonym of said chemical product, or both;

comparing said ratios to a constant, wherein said constant indicates the threshold for the magnitude of the ratio required for reporting that a raw material is consumed in the manufacture of said chemical product; and generating a list of hits, wherein a hit occurs whenever a ratio for a pair exceeds said constant.

8. The method for identifying raw materials of claim 7, further comprising the step of storing said hits in a table of hits.

9. The method for identifying raw materials of claim 8, further comprising the step of outputting results, wherein said results are raw materials that are included in said table of hits.

10. A method for identifying raw materials, that are consumed in the manufacture of a certain chemical product, in a database of companies comprising fields of chemical products manufactured by a company and raw materials purchased by a company, comprising the steps of:

receiving a name of a chemical product;

generating a list of synonyms of said chemical product from a table of synonyms;

creating a query consisting of said chemical product and said synonyms of said chemical product;

comparing said query to a subset of said database to generate a list of records that contain said chemical product or at least one said synonym of said chemical product, or both;

generating a list of pairs, wherein a pair is defined as said chemical product and one said raw material contained in one said record of said list of records;

creating a ratio for each said pair, wherein said ratio's numerator is the number of times said pair occurs in said subset of said database and said ratio's denominator is the number of records in said subset of said database that contain said chemical product or at least one said synonym of said chemical product, or both;

calibrating a constant based on said ratios, wherein said constant indicates the threshold for the magnitude of the ratio required for predicting that a raw material is consumed in the manufacture of said chemical product; and comparing said query against the entire database to generate a list of pairs, create a ratio for each pair, and generate a list of hits, wherein a hit occurs whenever a ratio for a pair exceeds said constant.

11. The method for identifying raw materials of claim 10, further comprising the step of storing said hits in a table of hits.

12. The method for identifying raw materials of claim 11, further comprising the step of outputting results, wherein said results are raw materials that are included in said table of hits.

13. A computer-readable medium containing instructions for causing a processor to perform a method of identifying chemical products, the manufacturing processes of which consume a certain raw material, in a database of companies comprising fields of chemical products manufactured by a company and raw materials purchased by a company, the method comprising the steps of:

receiving a name of a raw material;

generating a list of synonyms of said raw material from a table of synonyms;

creating a query consisting of said raw material and said synonyms of said raw material;

comparing said query to said database to generate a list of records that contain said raw material or at least one said synonym of said raw material, or both;

generating a list of pairs, wherein a pair is defined as said raw material and one said chemical product contained in one said record of said list of records;

creating a ratio for each said pair, wherein said ratio's numerator is the number of times said pair occurs in said database and said ratio's denominator is the number of records in the database that contain said raw material or at least one said synonym of said raw material, or both;

comparing said ratios to a constant, wherein said constant indicates the threshold for the magnitude of the ratio required for reporting that said raw material is consumed in the manufacture of a chemical product; and generating a list of hits, wherein a hit occurs whenever a ratio for a pair exceeds said constant.

14. The computer-readable medium containing instructions for causing a processor to perform a method for identifying chemical products of claim 13, wherein said method further comprises the step of storing said hits in a table of hits.

15. The computer-readable medium containing instructions for causing a processor to perform a method for identifying chemical products of claim 14, wherein said method further comprises the step of outputting results, wherein said results are chemical products that are included in said table of hits.

16. A computer-readable medium containing instructions for causing a processor to perform a method for identifying chemical products, the manufacturing processes of which consume a certain raw material, in a database of companies comprising fields of chemical products manufactured by a company and raw materials purchased by a company, the method comprising the steps of:

receiving a name of a raw material;

generating a list of synonyms of said raw material from a table of synonyms;

creating a query consisting of said raw material and said synonyms of said raw material;

comparing said query to a subset of said database to generate a list of records that contain said raw material or at least one said synonym of said raw material, or both;

generating a list of pairs, wherein a pair is defined as said raw material and one said chemical product contained in one said record of said list of records;

creating a ratio for each said pair, wherein said ratio's numerator is the number of times said pair occurs in said subset of said database and said ratio's denominator is the number of records in said subset of said database that contain said raw material or at least one said synonym of said raw material, or both;

calibrating a constant based on said ratios, wherein said constant indicates the threshold for the magnitude of the ratio required for predicting that said raw material is consumed in the manufacture of a chemical product; and comparing said query against the entire database to generate a list of pairs, create a ratio for each pair, and generate a list of hits, wherein a hit occurs whenever a ratio for a pair exceeds said constant.

17. The computer-readable medium containing instructions for causing a processor to perform a method for identifying chemical products of claim 16, wherein said method further comprises the step of storing said hits in a table of hits.

18. The computer-readable medium containing instructions for causing a processor to perform a method for identifying chemical products of claim 17, wherein said method further comprises the step of outputting results, wherein said results are chemical products that are included in said table of hits.

19. A computer-readable medium containing instructions for causing a processor to perform a method for identifying raw materials, that are consumed in the manufacture of a certain chemical product, in a database of companies comprising fields of chemical products manufactured by a company and raw materials purchased by a company, the method comprising the steps of:

receiving a name of a chemical product;

generating a list of synonyms of said chemical product from a table of synonyms;

creating a query consisting of said chemical product and said synonyms of said chemical product;

comparing said query to said database to generate a list of records that contain said chemical product or at least one said synonym of said chemical product, or both;

generating a list of pairs, wherein a pair is defined as said chemical product and one said raw material contained in one said record of said list of records;

creating a ratio for each said pair, wherein said ratio's numerator is the number of times said pair occurs in said database and said ratio's denominator is the number of records in the database that contain said chemical product or at least one said synonym of said chemical product, or both;

comparing said ratios to a constant, wherein said constant indicates the threshold for the magnitude of the ratio required for reporting that a raw material is consumed in the manufacture of said chemical product; and generating a list of hits, wherein a hit occurs whenever a ratio for a pair exceeds said constant.

20. The computer-readable medium containing instructions for causing a processor to perform a method for identifying raw materials of claim 19, wherein said method further comprises the step of storing said hits in a table of hits.

21. The computer-readable medium containing instructions for causing a processor to perform a method for identifying raw materials of claim 20, wherein said method further comprises the step of outputting results, wherein said results are raw materials that are included in said table of hits.

22. A computer-readable medium containing instructions for causing a processor to perform a method for identifying raw materials, that are consumed in the manufacture of a certain chemical product, in a database of companies comprising fields of chemical products manufactured by a company and raw materials purchased by a company, the method comprising the steps of:

receiving a name of a chemical product;

generating a list of synonyms of said chemical product from a table of synonyms;

creating a query consisting of said chemical product and said synonyms of said chemical product;

comparing said query to a subset of said database to generate a list of records that contain said chemical product or at least one said synonym of said chemical product, or both;

generating a list of pairs, wherein a pair is defined as said chemical product and one said raw material contained in one said record of said list of records;

creating a ratio for each said pair, wherein said ratio's numerator is the number of times said pair occurs in said subset of said database and said ratio's denominator is the number of records in said subset of said database that contain said chemical product or at least one said synonym of said chemical product, or both;

calibrating a constant based on said ratios, wherein said constant indicates the threshold for the magnitude of the ratio required for predicting that a raw material is consumed in the manufacture of said chemical product; and comparing said query against the entire database to generate a list of pairs, create a ratio for each pair, and generate a list of hits, wherein a hit occurs whenever a ratio for a pair exceeds said constant.

23. The computer-readable medium containing instructions for causing a processor to perform a method for identifying raw materials of claim 22, wherein said method further comprises the step of storing said hits in a table of hits.

24. The computer-readable medium containing instructions for causing a processor to perform a method for identifying raw materials of claim 23, wherein said method further comprises the step of outputting results, wherein said results are raw materials that are included in said table of hits.

25. A system for identifying chemical products, the manufacturing processes of which consume a certain raw material, in a database of companies comprising fields of chemical products manufactured by a company and raw materials purchased by a company, comprising:

means for inputting a name of a raw material;

means for generating a list of synonyms of said raw material from a table of synonyms;

means for creating a query consisting of said raw material and said synonyms of said raw material;

means for comparing said query to said database to generate a list of records that contain said raw material or at least one said synonym of said raw material, or both;

means for generating a list of pairs, wherein a pair is defined as said raw material and one said chemical product contained in one said record of said list of records;

means for creating a ratio for each said pair, wherein said ratio's numerator is the number of times said pair occurs in said database and said ratio's denominator is the number of records in the database that contain said raw material or at least one said synonym of said raw material, or both;

means for comparing said ratios to a constant, wherein said constant indicates the threshold for the magnitude of the ratio required for reporting that said raw material is consumed in the manufacture of a chemical product; and means for generating a list of hits, wherein a hit occurs whenever a ratio for a pair exceeds said constant.

26. The system for identifying chemical products of claim 25, further comprising means for storing said hits in a table of hits.

27. The system for identifying chemical products of claim 26, further comprising means for outputting results, wherein said results are chemical products that are included in said table of hits, and means for displaying said results.

28. A system for identifying chemical products, the manufacturing processes of which consume a certain raw material, in a database of companies comprising fields of chemical products manufactured by a company and raw materials purchased by a company, comprising:

means for inputting a name of a raw material;

means for generating a list of synonyms of said raw material from a table of synonyms;

means for creating a query consisting of said raw material and said synonyms of said raw material;

means for comparing said query to a subset of said database to generate a list of records that contain said raw material or at least one said synonym of said raw material, or both;

means for generating a list of pairs, wherein a pair is defined as said raw material and one said chemical product contained in one said record of said list of records;

means for creating a ratio for each said pair, wherein said ratio's numerator is the number of times said pair occurs in said subset of said database and said ratio's denominator is the number of records in said subset of said database that contain said raw material or at least one said synonym of said raw material, or both;

means for calibrating a constant based on said ratios, wherein said constant indicates the threshold for the magnitude of the ratio required for predicting that said raw material is consumed in the manufacture of a chemical product; and means for comparing said query against the entire database to generate a list of pairs, create a ratio for each pair, and generate a list of hits, wherein a hit occurs whenever a ratio for a pair exceeds said constant.

29. The system for identifying chemical products of claim 28, further comprising means for storing said hits in a table of hits.

30. The system for identifying chemical products of claim 29, further comprising means of outputting results, wherein said results are chemical products that are included in said table of hits, and means for displaying said results.

31. A system for identifying raw materials, that are consumed in the manufacture of a certain chemical product, in a database of companies comprising fields of chemical products manufactured by a company and raw materials purchased by a company, comprising:

means for inputting a name of a chemical product;

means for generating a list of synonyms of said chemical product from a table of synonyms;

means for creating a query consisting of said chemical product and said synonyms of said chemical product;

means for comparing said query to said database to generate a list of records that contain said chemical product or at least one said synonym of said chemical product, or both;

means for generating a list of pairs, wherein a pair is defined as said chemical product and one said raw material contained in one said record of said list of records;

means for creating a ratio for each said pair, wherein said ratio's numerator is the number of times said pair occurs in said database and said ratio's denominator is the number of records in the database that contain said chemical product or at least one said synonym of said chemical product, or both;

means for comparing said ratios to a constant, wherein said constant indicates the threshold for the magnitude of the ratio required for reporting that a raw material is consumed in the manufacture of said chemical product; and means for generating a list of hits, wherein a hit occurs whenever a ratio for a pair exceeds said constant.

32. The system for identifying raw materials of claim 31, further comprising means for storing said hits in a table of hits.

33. The system for identifying raw materials of claim 32, further comprising means for outputting results, wherein said results are raw materials that are included in said table of hits, and means for displaying said results.

34. A system for identifying raw materials, that are consumed in the manufacture of a certain chemical product, in a database of companies comprising fields of chemical products manufactured by a company and raw materials purchased by a company, comprising:

means for inputting a name of a chemical product;

means for generating a list of synonyms of said chemical product from a table of synonyms;

means for creating a query consisting of said chemical product and said synonyms of said chemical product;

means for comparing said query to a subset of said database to generate a list of records that contain said chemical product or at least one said synonym of said chemical product, or both;

means for generating a list of pairs, wherein a pair is defined as said chemical product and one said raw material contained in one said record of said list of records;

means for creating a ratio for each said pair, wherein said ratio's numerator is the number of times said pair occurs in said subset of said database and said ratio's denominator is the number of records in said subset of said database that contain said chemical product or at least one said synonym of said chemical product, or both;

means for calibrating a constant based on said ratios, wherein said constant indicates the threshold for the magnitude of the ratio required for predicting that a raw material is consumed in the manufacture of said chemical product; and means for comparing said query against the entire database to generate a list of pairs, create a ratio for each pair, and generate a list of hits, wherein a hit occurs whenever a ratio for a pair exceeds said constant.

35. The system for identifying raw materials of claim 34, further comprising means for storing said hits in a table of hits.

36. The system for identifying raw materials of claim 35, further comprising means for outputting results, wherein said results are raw materials that are included in said table of hits, and means for displaying said results.

37. An apparatus for identifying chemical products, the manufacturing processes of which consume a certain raw material, in a database of companies comprising fields of chemical products manufactured by a company and raw materials purchased by a company, comprising:

memory containing said database and an associated program; and a processor responsive to said program and configured to: (i) receive a name of a raw material; (ii) generate a list of synonyms of said raw material from a table of synonyms; (iii) create a query consisting of said raw material and said synonyms of said raw material; (iv) compare said query to said database to generate a list of records that contain said raw material or at least one said synonym of said raw material, or both; (v) generate a list of pairs, wherein a pair is defined as said raw material and one said chemical product contained in one said record of said list of records; (vi) create a ratio for each said pair, wherein said ratio's numerator is the number of times said pair occurs in said database and said ratio's denominator is the number of records in the database that contain said raw material or at least one said synonym of said raw material, or both; (vii) compare said ratios to a constant, wherein said constant indicates the threshold for the magnitude of the ratio required for reporting that said raw material is consumed in the manufacture of a chemical product; and (viii) generate a list of hits, wherein a hit occurs whenever a ratio for a pair exceeds said constant.

38. The apparatus for identifying chemical products of claim 37, wherein said processor is further configured to store said hits in a table of hits.

39. The apparatus for identifying chemical products of claim 38, wherein said processor is further configured to output results, wherein said results are chemical products that are included in said table of hits.

40. An apparatus for identifying chemical products, the manufacturing processes of which consume a certain raw material, in a database of companies comprising fields of chemical products manufactured by a company and raw materials purchased by a company, comprising:

memory containing said database and an associated program; and a processor responsive to said program and configured to: (i) receive a name of a raw material; (ii) generate a list of synonyms of said raw material from a table of synonyms; (iii) create a query consisting of said raw material and said synonyms of said raw material; (iv) compare said query to a subset of said database to generate a list of records that contain said raw material or at least one said synonym of said raw material, or both; (v) generate a list of pairs, wherein a pair is defined as said raw material and one said chemical product contained in one said record of said list of records; (vi) create a ratio for each said pair, wherein said ratio's numerator is the number of times said pair occurs in said subset of said database and said ratio's denominator is the number of records in said subset of said database that contain said raw material or at least one said synonym of said raw material, or both; (vii) calibrate a constant based on said ratios, wherein said constant indicates the threshold for the magnitude of the ratio required for predicting that said raw material is consumed in the manufacture of a chemical product; and (viii) compare said query against the entire database to generate a list of pairs, create a ratio for each pair, and generate a list of hits, wherein a hit occurs whenever a ratio for a pair exceeds said constant.

41. The apparatus for identifying chemical products of claim 40, wherein said processor is further configured to store said hits in a table of hits.

42. The apparatus for identifying chemical products of claim 41, wherein said processor is further configured to output results and said results are chemical products that are included in said table of hits.

43. An apparatus for identifying raw materials that are consumed in the manufacture of a certain chemical product, in a database of companies comprising fields of chemical products manufactured by a company and raw materials purchased by a company, comprising:
   memory containing said database and an associated program; and
   a processor responsive to said program and configured to: (i) receive a name of a chemical product; (ii) generate a list of synonyms of said chemical product from a table of synonyms; (iii) create a query consisting of said chemical product and said synonyms of said chemical product; (iv) compare said query to said database to generate a list of records that contain said chemical product or at least one said synonym of said chemical product, or both; (v) generate a list of pairs, wherein a pair is defined as said chemical product and one said raw material contained in one said record of said list of records; (vi) create a ratio for each said pair, wherein said ratio's numerator is the number of times said pair occurs in said database and said ratio's denominator is the number of records in the database that contain said chemical product or at least one said synonym of said chemical product, or both; (vii) compare said ratios to a constant, wherein said constant indicates the threshold for the magnitude of the ratio required for reporting that a raw material is consumed in the manufacture of said chemical product; and (viii) generate a list of hits, wherein a hit occurs whenever a ratio for a pair exceeds said constant.

44. The apparatus for identifying raw materials of claim 43, wherein said processor is further configured to store said hits in a table of hits.

45. The apparatus for identifying raw materials of claim 44, wherein said processor is further configured to output results and said results are raw materials that are included in said table of hits.

46. An apparatus for identifying raw materials, that are consumed in the manufacture of a certain chemical product, in a database of companies comprising fields of chemical products manufactured by a company and raw materials purchased by a company, comprising:
   memory containing said database and an associated program; and
   a processor responsive to said program and configured to: (i) receive a name of a chemical product; (ii) generate a list of synonyms of said chemical product from a table of synonyms; (iii) create a query consisting of said chemical product and said synonyms of said chemical product; (iv) compare said query to a subset of said database to generate a list of records that contain said chemical product or at least one said synonym of said chemical product, or both; (v) generate a list of pairs, wherein a pair is defined as said chemical product and one said raw material contained in one said record of said list of records; (vi) create a ratio for each said pair, wherein said rations numerator is the number of times said pair occurs in said subset of said database and said ratio's denominator is the number of records in said subset of said database that contain said chemical product or at least one said synonym of said chemical product, or both; (vii) calibrate a constant based on said ratios, wherein said constant indicates the threshold for the magnitude of the ratio required for predicting that a raw material is consumed in the manufacture of said chemical product; and (viii) compare said query against the entire database to generate a list of pairs, create a ratio for each pair, and generate a list of hits, wherein a hit occurs whenever a ratio for a pair exceeds said constant.

47. The apparatus for identifying raw materials of claim 46, wherein said processor is further configured to store said hits in a table of hits.

48. The apparatus for identifying raw materials of claim 47, wherein said processor is further configured to output results and said results are raw materials that are included in said table of hits.

49. An apparatus for identifying chemical products, the manufacturing processes of which consume a certain raw material, in a database of companies comprising fields of chemical products manufactured by a company and raw materials purchased by a company, comprising:
   memory containing a program;
   a processor responsive to said program and configured to send a name of a raw material to a server so that the server will: (i) generate a list of synonyms of said raw material from a table of synonyms; (ii) create a query consisting of said raw material and said synonyms of said raw material; (iii) compare said query to said database to generate a list of records that contain said raw material or at least one said synonym of said raw material, or both; (iv) generate a list of pairs, wherein a pair is defined as said raw material and one said chemical product contained in one said record of said list of records; (v) create a ratio for each said pair, wherein said ratio's numerator is the number of times said pair occurs in said database and said ratio's denominator is the number of records in the database that contain said raw material or at least one said synonym of said raw material, or both; (vi) compare said ratios to a constant, wherein said constant indicates the threshold for the magnitude of the ratio required for reporting that said raw material is consumed in the manufacture of a chemical product; (vii) generate a list of hits, wherein a hit occurs whenever a ratio for a pair exceeds said constant; (viii) store said hits in a table of hits; and (ix) output results to said apparatus, wherein said results are chemical products that are included in said table of hits; and a monitor to display said results.

50. An apparatus for identifying chemical products, the manufacturing processes of which consume a certain raw material, in a database of companies comprising fields of chemical products manufactured by a company and raw materials purchased by a company, comprising:

memory containing a program;

a processor responsive to said program and configured to send a name of a raw material to a server so that the server will: (i) generate a list of synonyms of said raw material from a table of synonyms; (ii) create a query consisting of said raw material and said synonyms of said raw material; (iii) compare said query to a subset of said database to generate a list of records that contain said raw material or at least one said synonym of said raw material, or both; (iv) generate a list of pairs, wherein a pair is defined as said raw material and one said chemical product contained in one said record of said list of records; (v) create a ratio for each said pair, wherein said ratio's numerator is the number of times said pair occurs in said subset of said database and said ratio's denominator is the number of records in said subset of said database that contain said raw material or at least one said synonym of said raw material, or both; (vi) calibrate a constant based on said ratios, wherein said constant indicates the threshold for the magnitude of the ratio required for predicting that said raw material is consumed in the manufacture of a chemical product; (vii) compare said query against the entire database to generate a list of pairs, create a ratio for each pair, and generate a list of hits, wherein a hit occurs whenever a ratio for a pair exceeds said constant; (viii) store said hits in a table of hits; and (ix) output results to said apparatus, wherein said results are chemical products that are included in said table of hits; and a monitor to display said results.

51. An apparatus for identifying raw materials that are consumed in the manufacture of a certain chemical product, in a database of companies comprising fields of chemical products manufactured by a company and raw materials purchased by a company, comprising:

memory containing a program;

a processor responsive to said program and configured to send a name of a chemical product to a server so that the server will: (i) generate a list of synonyms of said chemical product from a table of synonyms; (ii) create a query consisting of said chemical product and said synonyms of said chemical product; (iii) compare said query to said database to generate a list of records that contain said chemical product or at least one said synonym of said chemical product, or both; (iv) generate a list of pairs, wherein a pair is defined as said chemical product and one said raw material contained in one said record of said list of records; (v) create a ratio for each said pair, wherein said ratio's numerator is the number of times said pair occurs in said database and said ratio's denominator is the number of records in the database that contain said chemical product or at least one said synonym of said chemical product, or both; (vi) compare said ratios to a constant, wherein said constant indicates the threshold for the magnitude of the ratio required for reporting that a raw material is consumed in the manufacture of said chemical product; (vii) generate a list of hits, wherein a hit occurs whenever a ratio for a pair exceeds said constant; (viii) store said hits in a table of hits; and (ix) output results to said apparatus, wherein said results are raw materials that are included in said table of hits; and a monitor to display said results.

52. An apparatus for identifying raw materials that are consumed in the manufacture of a certain chemical product, in a database of companies comprising fields of chemical products manufactured by a company and raw materials purchased by a company, comprising:

memory containing a program;

a processor responsive to said program and configured to send a name of chemical product to a server so that the server will: (i) generate a list of synonyms of said chemical product from a table of synonyms; (ii) create a query consisting of said chemical product and said synonyms of said chemical product; (iii) compare said query to a subset of said database to generate a list of records that contain said chemical product or at least one said synonym of said chemical product, or both; (iv) generate a list of pairs, wherein a pair is defined as said chemical product and one said raw material contained in one said record of said list of records; (v) create a ratio for each said pair, wherein said ratio's numerator is the number of times said pair occurs in said subset of said database and said ratio's denominator is the number of records in said subset of said database that contain said chemical product or at least one said synonym of said chemical product, or both; (vi) calibrate a constant based on said ratios, wherein said constant indicates the threshold for the magnitude of the ratio required for predicting that a raw material is consumed in the manufacture of said chemical product; (vii) compare said query against the entire database to generate a list of pairs, create a ratio for each pair, and generate a list of hits, wherein a hit occurs whenever a ratio for a pair exceeds said constant; (viii) store said hits in a table of hits; and (ix) output results to said apparatus, wherein said results are raw materials that are included in said table of hits; and a monitor to display said results.

* * * * *